United States Patent
Kinkead

(10) Patent No.: US 7,031,223 B2
(45) Date of Patent: Apr. 18, 2006

(54) METHOD FOR CORRECTING SEISMIC DATA FOR RECEIVER MOVEMENT DURING DATA ACQUISITION

(75) Inventor: Jack Dewayne Kinkead, Cypress, TX (US)

(73) Assignee: PGS Americas, Inc., Houston, TX (US)

( * ) Notice: Subject to any disclaimer, the term of this patent is extended or adjusted under 35 U.S.C. 154(b) by 11 days.

(21) Appl. No.: 10/836,025

(22) Filed: Apr. 30, 2004

(65) Prior Publication Data

US 2005/0243648 A1 Nov. 3, 2005

(51) Int. Cl.
*G01V 1/38* (2006.01)

(52) U.S. Cl. .......................... 367/21; 367/15; 367/20; 367/22; 367/23; 181/110

(58) Field of Classification Search ................ 367/15, 367/20–23, 38; 181/110, 118
See application file for complete search history.

(56) References Cited

U.S. PATENT DOCUMENTS

| | | | | |
|---|---|---|---|---|
| 3,806,863 A | * | 4/1974 | Tilley et al. ................. | 367/21 |
| 4,809,235 A | * | 2/1989 | Dragoset, Jr. ............... | 367/21 |
| 5,050,129 A | * | 9/1991 | Schultz ....................... | 367/21 |
| 5,784,335 A | | 7/1998 | Deplante et al. | |
| 6,049,507 A | | 4/2000 | Allen | |
| 6,151,556 A | | 11/2000 | Allen | |
| 6,480,440 B1 | | 11/2002 | Douma et al. | |
| 6,876,599 B1 | * | 4/2005 | Combee ...................... | 367/21 |
| 6,898,148 B1 | * | 5/2005 | MacKay ...................... | 367/52 |
| 2002/0126576 A1 | * | 9/2002 | Douma et al. .............. | 367/21 |

OTHER PUBLICATIONS

Hampsopn and Jakubowicz. "The effects of source and receiver motion on seismic data." Geophysical Prospecting, 1995.*
Dragoset. "Marine Vibrators and the Doppler effect." Geophysics, vol. 53, No. 11 (Nov. 1988).*
GameDev.net "Motion Along a Straight Line." http://www.gamedev.net/reference/articles/article434.asp. Aug. 6, 1999.*

* cited by examiner

*Primary Examiner*—Jack Keith
*Assistant Examiner*—Scott A. Hughes
(74) *Attorney, Agent, or Firm*—E. Eugene Thigpen; Richard A. Fagin

(57) ABSTRACT

A method is disclosed for processing seismic data. The method includes determining a position of a seismic energy source and seismic receivers at a time of actuation of the source. A velocity of the seismic receivers with respect to the source position is determined at the time of actuation. An offset of the receivers is corrected using the velocity. A moveout correction is determined for the signals detected by the sensors based on the corrected offset and a velocity of earth media through which seismic energy passed from the source to the sensors.

18 Claims, 6 Drawing Sheets

METHOD FOR CORRECTING SEISMIC DATA FOR RECEIVER MOVEMENT DURING DATA ACQUISITION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic data acquisition and interpretation. More specifically, the invention relates to methods for correcting marine seismic data for the effects of receiver movement during data recording after actuation of a seismic energy source.

2. Background Art

Seismic surveying is used to evaluate structures of, compositions of, and fluid content of subsurface earth formations. A particular application for seismic surveying is to infer the presence of useful materials, such as petroleum, in the subsurface earth formations. Generally, seismic surveying includes deploying an array of seismic sensors at or near the earth's surface, and deploying a seismic energy source near the sensors also at or near the surface. The seismic energy source is actuated and seismic energy emanates from the source, traveling generally downwardly through the subsurface until it reaches one or more acoustic impedance boundaries. Seismic energy is reflected from the one or more impedance boundaries, where it then travels upwardly until being detected by one or more of the sensors. Structure and composition of the subsurface is inferred from the travel time of the seismic energy, and the amplitude and phase of the various frequency components of the seismic energy with respect to the energy emanating from the seismic source.

Marine seismic surveying techniques known in the art include towing a seismic energy source behind a ship, and towing one or more arrays of seismic sensors ("streamers") behind the same or a different ship, along the surface of a body of water. The seismic energy source may be an air gun or array of air guns, a water gun, explosives any or other type of seismic energy source well known in the art. A streamer generally consists of a long cable having seismic sensors, typically hydrophones, disposed thereon at selected positions along the cable. The streamer generally extends behind the ship and along the direction of motion of the ship. If more than one streamer is used in a sensor array, the streamers include equipment designed to hold the streamers at laterally spaced apart positions from each other.

The seismic survey ship typically includes a data recording system. The data recording system includes a device for controllably actuating the seismic energy source, equipment for determining the geographic position of the ship at any moment in time (typically using global positioning system (GPS) navigation devices), and equipment for recording the signals generated by the seismic sensors in response to seismic energy reflected from the subsurface earth formations. The recordings of the signals are typically indexed with respect to each time of actuation of the seismic energy source. The GPS navigation equipment may also include devices to determine the geographic position of each sensor on each streamer at any selected time.

During a marine seismic survey, the ship moves along a selected path, called a "sail line" through the water. At selected times, the seismic energy source is actuated, and the signals detected by the seismic sensors are recorded with respect to time. At the time of actuation of the source, the geographic position of the ship, the seismic source and each sensor on the one or more streamers is recorded. To interpret the recorded signals to infer structure and composition of the subsurface earth formations, it is necessary to know the geographic position of the source and each sensor at the time the signals were recorded. This is both to assure that seismic signals correspond to determinable geographic positions with respect to the earth's surface, and to enable various forms of signal correlation and stacking, such as common mid point (CMP) stacking to be properly performed. During acquisition of seismic data, however, the ship, the source and the streamers are moving along the water surface. As a practical matter, the position of the source at the time of source actuation can be used as the actual position of the source, because the duration of the energy impulses generated by the source is short enough such that the ship, source and streamers do not move a substantial amount during any individual source actuation. However, seismic energy can take several seconds to travel through the water, through the subsurface earth formations, reflect upwardly and travel back through the formations, the water and to the seismic sensors. Therefore, the sensors may move a substantial distance between the time of actuation of the source and the end of signal recording for any individual source actuation. The amount that the sensors move depends on the velocity of the ship, the dynamic stretching of the cable, the deflection of the cable due to currents, and the two-way travel time of the seismic energy from the source to each of the sensors. As a result, the geographic position of the subsurface acoustic impedance boundaries corresponding to the detected seismic energy change during the recording.

There are methods known in the art for correcting seismic data recordings for movement of the seismic sensors during recording. One example of such methods is disclosed in U.S. Pat. No. 6,151,556 issued to Allen. The method disclosed in the Allen '556 patent is primarily intended for use with marine vibrator sources, which produce a seismic energy pulse over a period of several seconds. The method includes correcting signals for the movement of the seismic source, correcting signals for the movement of the receivers and combining the corrected data. The method in the Allen '556 patent assumes that the motion of the source and the receivers is substantially the same as the motion of the seismic vessel.

U.S. Pat. No. 6,480,440 issued to Douma et al. discloses another method for correcting seismic data for receiver motion. The method disclosed in the '440 patent includes determining an offset between the seismic source and a seismic receiver, determining a normal moveout velocity of the seismic energy between the source and the receiver, and determining a corrected arrival time of reflected seismic energy based on the normal moveout velocity and the velocity of the seismic vessel. A limitation of the methods disclosed in the foregoing references is that they only account for movement of the sensors as being directly related to the velocity of the seismic vessel. In some instances, the sensors may also move transversely with respect to the sail line due to, for example, currents in the water. It is also possible that the component of the sensor velocity along the sail line does not precisely match the velocity of the seismic vessel due to stretching of the streamer cable. It is therefore desirable to have a method to correct seismic data for movement of the sensors that takes account of the sensor velocity in both the sail line and transverse directions.

SUMMARY OF THE INVENTION

One aspect of the invention is a method for processing seismic data. The method according to this aspect includes determining a position of a seismic energy source and seismic receivers at a time of actuation of the source. A velocity of the seismic receivers with respect to the source position is determined at the time of actuation. A moveout correction is determined for the signals detected by the sensors based on the velocity of the receiver, the distance between the receiver and source at the time of actuation of the source, and a velocity of earth media through which seismic energy passed from the source to the sensors.

Another aspect of the invention is a computer program stored in a computer readable medium. The program includes logic operable to cause a programmable computer to perform steps including the following: determining a position of a seismic energy source and seismic receivers at a time of actuation of the source; determining a velocity of the seismic receivers with respect to the source position at the time of actuation; and determining a moveout correction for the signals detected by the sensors based on the velocity of the receiver, the distance between the receiver and source at the time of actuation of the source, and a velocity of earth media through which seismic energy passed from the source to the sensors.

Another aspect of the invention is a method for seismic surveying. A method according to this aspect of the invention includes towing a seismic energy source in a body of water, towing a plurality of seismic sensors in the water at selected positions spaced apart from the source and actuating the source at selected times. The method includes recording signals detected by the sensors. The recordings are indexed to the source actuation times. Positions of the seismic energy source and the seismic receivers are determined at each time of actuation of the seismic source. A velocity of each of the seismic receivers is determined with respect to the source position at each actuation time. A moveout correction for the signals detected by the sensors is determined based on the velocity of the receiver, the distance between the receiver and source at the time of actuation of the source and a velocity of earth media through which seismic energy passed from the source to the sensors.

Other aspects and advantages of the invention will be apparent from the following description and the appended claims.

DETAILED DESCRIPTION

Figure 1:
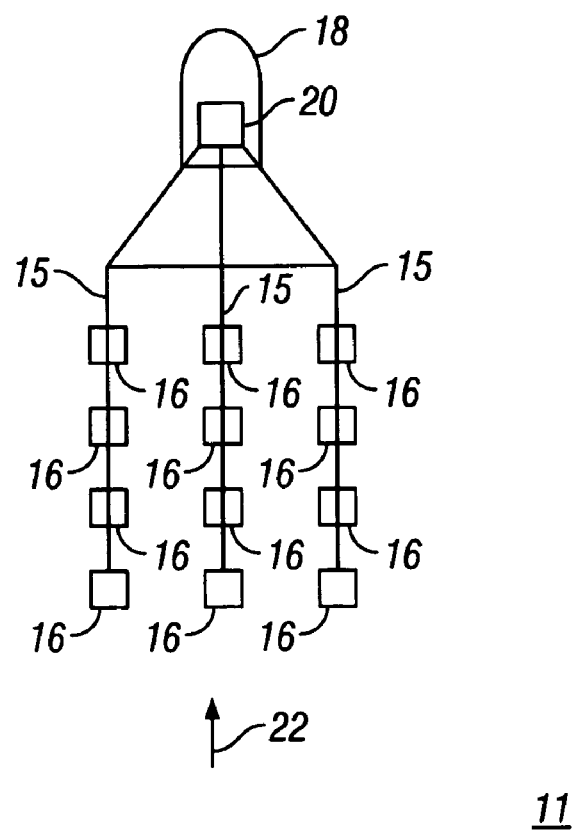
FIG. 1 shows an example of acquiring seismic data according to one embodiment of the invention.
Figure 1:
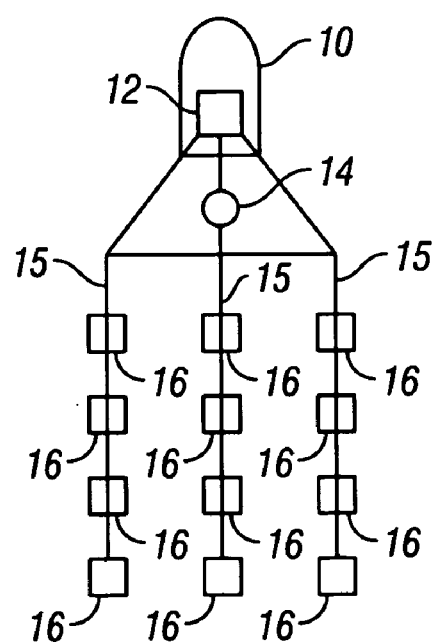

An example of marine seismic data acquisition techniques that can be used with embodiments of a method according to the invention is shown in FIG. 1. A first seismic vessel 10 includes signal recording, source control and navigation systems, shown generally at 12 and referred to for convenience as the "recording system." The recording system 12 may include devices (not shown separately) to control actuation of a seismic energy source 14 that is towed in the water 11 by the first vessel 10. The source 14 may be an air gun, air gun array, water gun or any other type of seismic energy source known in the art for marine seismic surveying. It should be noted that the invention will produce the best results when impulsive type sources are used. Other implementations of seismic data acquisition may include more than one seismic energy source. The number of seismic energy sources, the type of source and the position of any seismic energy source with respect to the first seismic vessel 10 are not intended to limit the scope of the invention. As will be explained below, it is only necessary to know the position of the source 14 at the times it is actuated.

The recording system 12 may also include devices (not shown separately) for recording signals generated by each one of a plurality of seismic sensors 16 towed by the first seismic vessel 10. The sensors 16 may be hydrophones, and are disposed at spaced apart positions along one or more seismic streamers 15. While three streamers 15 are shown in FIG. 1 being towed behind the first seismic vessel 10, the number of such streamers and their lateral spacing (if plural streamers are used) are not intended to limit the scope of the invention.

The recording system 12 may also include devices (not shown separately) for determining the geographic position of the source 14 and each of the sensors 16 at selected times. The position determining devices (not shown) may be global positioning satellite system (GPS) receivers or other device known in the art for precisely determining geographic position at selected times. Typically, the selected times are the times at which the source controller (not shown separately) actuates the source 14. However, the exact times at which source and sensor positions are determined is not intended to limit the scope of the invention.

The acquisition arrangement shown in FIG. 1 includes an auxiliary, or second, seismic vessel shown generally at 18. The second seismic vessel 18 is shown towing three streamers 15 having seismic sensors thereon as shown generally at 16. Equipment 20 on board the second seismic vessel 18 may include recording and navigation systems such as on the first vessel 10 or may include communication equipment for transmitting the seismic signals detected by the sensors 16 to the recording system 12 on the first vessel. The streamers may also include equipment (not shown separately in FIG. 1) for determining the geographic position of each sensor 16 towed by the second vessel 18 at selected times. As is the case for the sensors 16 towed by the first vessel 10, the selected times for determining the position of the sensors 16 towed by the second vessel 18 may be the actuation times of the seismic source 14.

The vessels 10, 18 are shown moving along the surface of the water 11 along a selected direction known as a sail line, shown generally at 22. The arrangement for acquiring seismic data shown in FIG. 1 is used to survey a very broad area of the subsurface using a relatively limited number of actuations of the seismic energy source 14. Such arrangements are known to be time and cost efficient for acquiring seismic data. It should be understood, however, that the arrangement of seismic energy source 14, seismic vessels 10, 18, and sensors 16 shown in FIG. 1 is only meant to serve as an example of arrangements suitable for acquiring seismic data applicable to the present invention. In various embodiments of a method according to the invention, and as will be further explained below with respect to FIG. 2, it is only necessary to determine the position of the source 14 and each sensor 16 at the time of actuation of the source, and to determine the velocity along the water surface 11 of each sensor 16 at the time of actuation of the source. Therefore, any other arrangement of vessel, vessels, sources and sensors known in the art for acquiring seismic data may be used in various embodiments of the invention.

The arrangement shown in FIG. 1 is used in this description because it illustrates both the case where the sensors 16 are moving away from the position of the source 14 at the time of actuation (the receivers towed by the second vessel 18) and the case where the sensors 16 are moving toward the source position at the time of actuation (the receivers towed by the first vessel 10). It should be clearly understood, however, that for purposes of the invention, it is not necessary to have seismic signals acquired where streamers are towed both ahead of and behind the source position. It is only necessary that there be some sensor velocity with respect to the source position during data acquisition. Accordingly, the invention is not limited in scope to data acquired using arrangements such as shown in FIG. 1.

Figure 2:
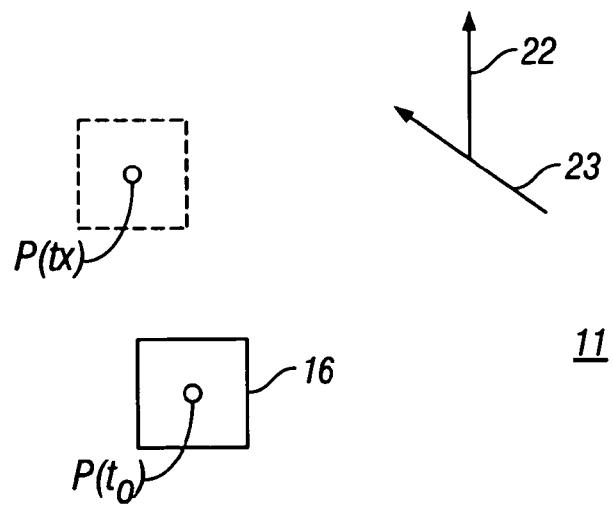
FIG. 2 illustrates motion of a seismic sensor during recording having both along the sail line component and a transverse component of velocity.

FIG. 2 shows movement of one of the sensors 16 during acquisition of seismic signals. At the time the source (14 in FIG. 1) is actuated, indicated by $t_0$, the sensor 16 is located at a position designated by $P(t_0)$. The sensor 16 is moving through the water 11 with a velocity that has a component related to (but not necessarily precisely equal to) movement of the vessel (10 or 18 in FIG. 1) along the sail line, indicated by numeral 22, and a transverse component 23 related to, for example, currents in the water 11. The transverse component 23 may be in any azimuthal direction with respect to the sail line 22, and need not be explicitly determined, as will be explained below. Most of the time, equipment towed by the vessel (10 or 18 in FIG. 1) will provide that the sensor velocity is substantially equal to the velocity of the vessel along the sail line 22. However, in some cases, the transverse component 23 may cause the sensor 16 to move with a velocity not equal to the vessel velocity. At any time during the recording of seismic signals, the time being indicated by $t_x$, the sensor 16 will be located at a position shown by $P(t_x)$.

In one embodiment, the sensor velocity, referred to as $v_r$, may be determined by using the difference between the sensor position determined at a first source actuation time and the sensor position determined at a second source actuation time. Alternatively, the time between determinations of the sensor position used to determine sensor velocity may be one or more multiples of the sample time of the navigation devices (part of the recording system 12 in FIG. 1).

In the present embodiment, the sensor velocity for each sensor (16 in FIG. 1) can be determined each time the seismic source (14 in FIG. 1) is actuated. The velocity thus determined for each sensor (16 in FIG. 1) is used to determine an actual "offset" (the distance between each sensor and the seismic source position at t=0) of each sensor at selected times after the actuation of the source. The actual offsets thus determined are used to perform normal moveout correction on the signals detected by each one of the sensors. Normal moveout correction, as is known in the art, adjusts the time at which signals are recorded by each one of the sensors (16 in FIG. 1) such that the signals correspond to those which would have been recorded if the sensor and the source were substantially collocated along the water surface (have zero offset). The sensor velocity, represented by $v_r$, at any time, represented by t=N, with respect to time of the actuation of the source, represented by t=0, (14 in FIG. 1) can be determined by the following expression:

$$v_r = (1/N) \times [((x_{r,t=N} - x_{s,t=0})^2 + (y_{r,t=N} - y_{s,t=0})^2)^{0.5} - ((x_{r,t=0} - x_{s,t=0})^2 + (y_{r,t=0} - y_{s,t=0})^2)^{0.5}] \quad (1)$$

in which the coordinates $x_r$, $y_r$, represent the sensor position at times t=0 and t=N, respectively, and $x_s$, $y_s$ represent the seismic source position at time t=0. The sensor velocity $v_r$, in equation (1) is a vector, and includes components of motion in at least two directions, preferably orthogonal directions to simplify calculations. To further simplify calculations, the components of the sensor velocity may include a component along the direction of motion of the first seismic vessel (10 in FIG. 1) ("subline" component), and a component transverse to the direction of motion ("crossline" component) of the first seismic vessel (10 in FIG. 1), however, any other coordinate system may be used to determine components of sensor motion from the sensor position at various times. As used in the description of the invention, therefore, the term "velocity" includes both a magnitude, and a direction which may be resolved into at least two component directions.

For any sensor, normal moveout of the recorded signals can be determined by the familiar expression:

$$t_x^2 = t_0^2 + (X/V)^2 \quad (2)$$

in which $t_0$ represents the signal time that would obtain at zero offset (zero offset being the case where the source and sensor are collocated at the surface), $t_x$ represents the actual recorded signal time, X represents the source to sensor distance, or "offset", and V represents the velocity of the media through which the seismic energy travels on a path from the source to the particular sensor. Applying normal moveout correction to seismic data thus transposes a signal measured at time $t_x$ to the time of $t_0$. Correspondingly, the inverse process, commonly referred to as removing the normal moveout correction, transposes signals measured at time $t_0$ to the time $t_x$. Equation (2), as known in the art, assumes that the offset between each sensor and the source position is constant during signal acquisition. As explained previously with respect to FIG. 1, there are essentially two distinct cases of sensor velocity with respect to the position of the source. In the first case, the sensor is moving generally away from the source position during signal recording. This corresponds to the sensors (16 in FIG. 1) being towed by the second vessel (18 in FIG. 1). Because the sensor is moving with velocity $v_r$, the offset changes with respect to time by the expression:

$$X' = X + (v_r t_x) \quad (3)$$

Substituting the sensor velocity-corrected offset from equation (3) above into the expression for normal moveout, i.e, equation (1), provides the following expression for the recorded signal time ($t'_x$) that takes account of the determined sensor velocity (and corresponding actual offset):

$$t'^2_x = t_0^2 + (X + (v_r t_x))/V)^2 \quad (4)$$

It can be shown that:

$$t'^2_x = t^2_x + (v_r^2 t_x^2 + 2Xv_r t_x)/V^2 \quad (5)$$

Further, because the quantity $2Xv_r t_x$ is much greater than the quantity $v_r^2 t_x^2$, the latter quantity may be ignored in equations (5) and the following substitutions can be made:

$$X' = (2v_r X)^{1/2} \quad (6)$$

and a scaled velocity field V' can be calculated by the expression:

$$V' = V/(t_x)^{1/2} \quad (7)$$

It can be shown that the sensor velocity corrected arrival time is:

$$t'^2_x = t^2_x + (X'/V')^2 \quad (8)$$

The expression above shows that by applying the scaled velocity field V' in the expression for normal moveout correction and the sensor velocity-modified offset term X', a sensor velocity corrected moveout time can be determined for any or all of the sensor signal recordings.

In the second case, the sensor is moving generally toward the source position during recording. This corresponds to the sensors (16 in FIG. 1) being towed by the first vessel (10 in FIG. 1). Because the sensor is moving with velocity $v_r$, the offset changes with respect to time by the expression:

$$X = X - (v_r t_x) \quad (9)$$

Substituting the velocity-corrected moveout into the expression for normal moveout provides the following expression for the recorded signal time accounting for the determined sensor velocity ($t'_x$):

$$t'^2_x = t_0^2 + (X - (v_r t_x))/V)^2 \quad (10)$$

It can be shown that:

$$t'^2_x = t^2_x + (v_r^2 t_x^2 - 2Xv_r t_x)/V^2 \quad (11)$$

As before, because the quantity $2Xv_r t_x$ is much greater than the quantity $v_r^2 t_x^2$, the latter quantity may be ignored in equation (11) and the substitution of the values X' and V' can be made resulting in the following equation:

$$t'^2_x = t^2_x - (X'^2/V'^2) \quad (12)$$

Rearranging the terms to correspond to a typical normal moveout equation yields the following expression:

$$t^2_x = t'^2_x + (X'^2/V'^2) \quad (13)$$

The expression above shows that by applying the scaled velocity field V' and the modified offset term X' in the expression for normal moveout correction, a sensor velocity corrected moveout time can be determined for any or all of the sensor signal recordings.

Figure 3:
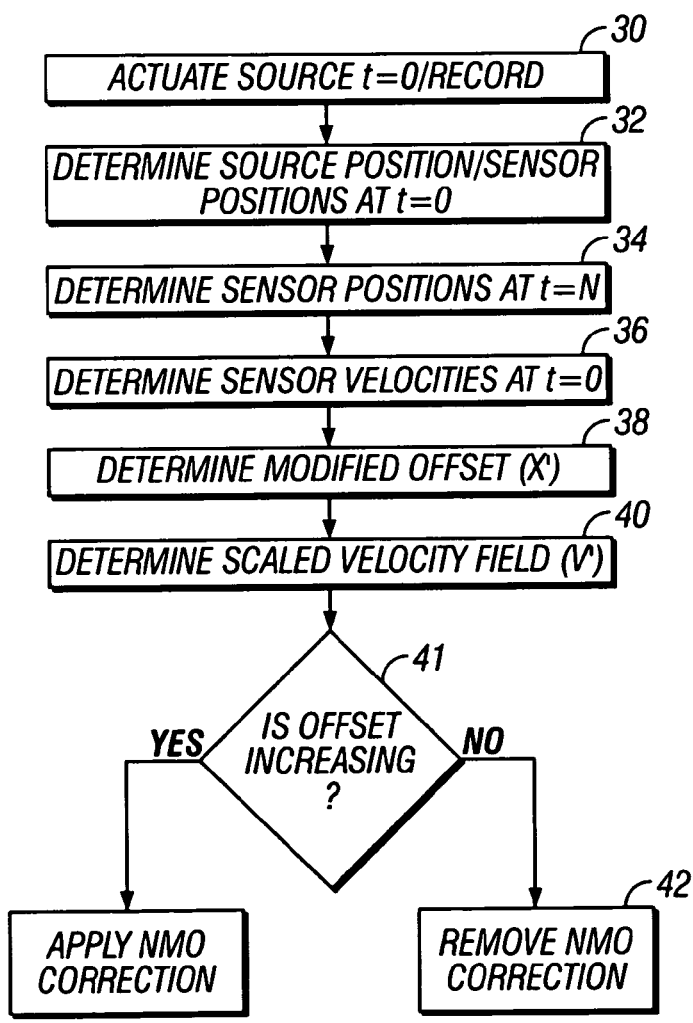
FIG. 3 is a flow chart of one embodiment of a method according to the invention.

The foregoing embodiments may be implemented as shown in the example flow chart of FIG. 3. At 30, the seismic energy source (14 in FIG. 1) is actuated. This corresponds to $t=t_0$. Signal recording from one or more of the sensors (16 in FIG. 1) takes place, time indexed to the source actuation time. At the time of actuation, and as shown at 32, a position of the source and each sensor is determined at $t_0$. At 34, a position of each sensor is determined at a later time t=N. As explained above with respect to FIG. 1, time t=N may be at the subsequent source actuation time, previous source actuation time, or a time related to the sample interval of the navigation devices. At 34, the velocity of each sensor is determined at the source actuation time. Determining the velocity can be performed as explained above with respect to equation (1). At 38, a modified offset of each sensor is determined using the velocity determined at 36 and the offset at time of source actuation. The time, $t_x$ and the original velocity field are used to determine a scaled velocity field, at 40. At 41, the sensor velocity is used to determine whether the offset is increasing or decreasing. The modified offset and scaled velocity field are used, at 42 to apply or remove a normal moveout correction to the recorded signals that is corrected for velocity of the sensors during recording, depending on whether the offset is increasing or decreasing, respectively.

Figure 4:
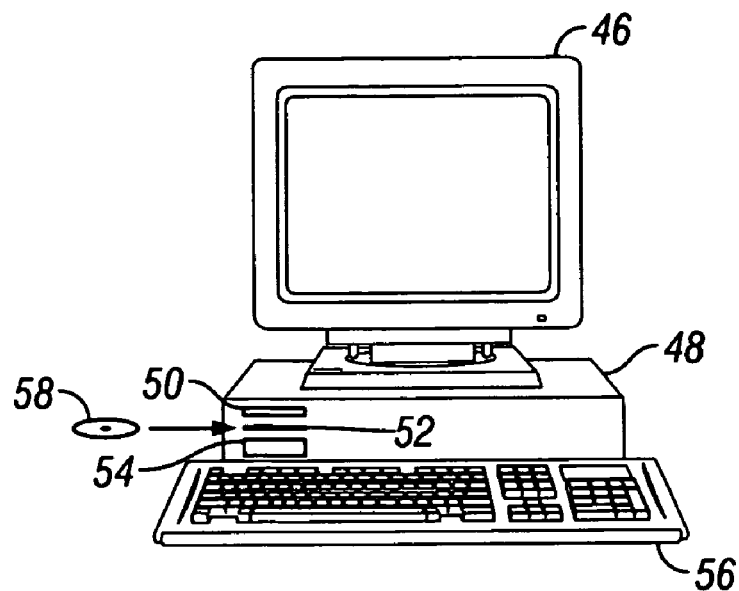
FIG. 4 shows a programmable computer configured to read a program according to the invention stored on a computer readable medium.

In another aspect, the invention relates to computer programs providing logic operable to cause a programmable computer to perform steps corresponding to the method explained above with respect to FIGS. 1–3. Referring to FIG. 4, a general purpose, programmable computer 48 includes readable storage devices, such as a floppy disk drive 50, a CD-ROM or CD-R/W drive 52, and/or a hard drive 54. Each of the storage devices can be interrogated by the computer 48 to retrieve data and/or program logic. In the example of FIG. 4, a CD 58 stores logic operable to cause the computer to perform the steps explained previously. The computer 48 may also include user input devices such as a keyboard 56 and a display device such as a flat-panel liquid crystal display (LCD) 46. Seismic data processed according to one or more embodiments of the invention may also be stored and read from any or all of the storage media or any other type of storage device known in the art.

Figure 5:
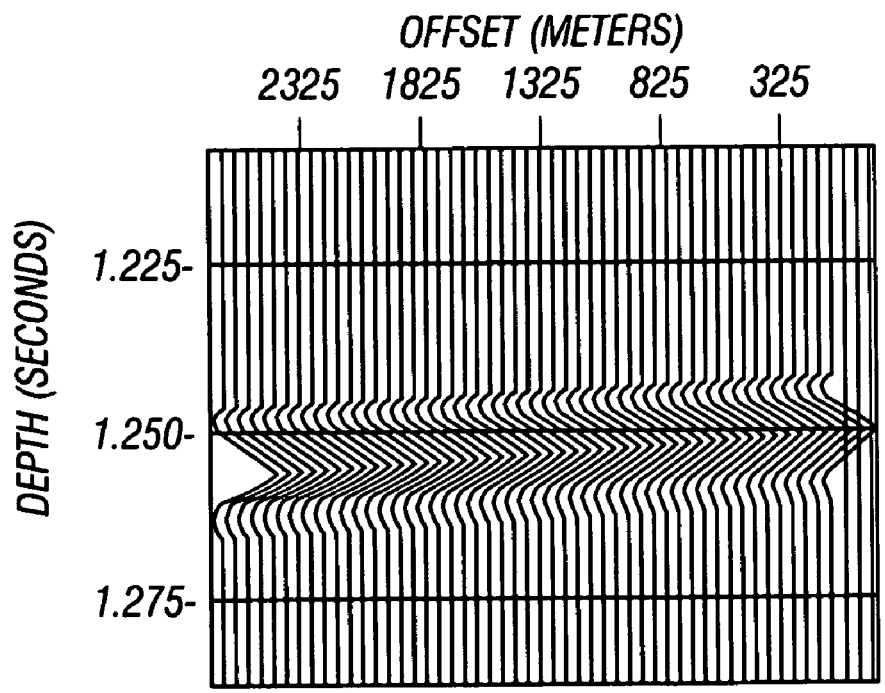
FIG. 5 shows a synthetic data set having timing error associated with sensor movement during acquisition wherein the sensors move away from the source position.
Figure 6:
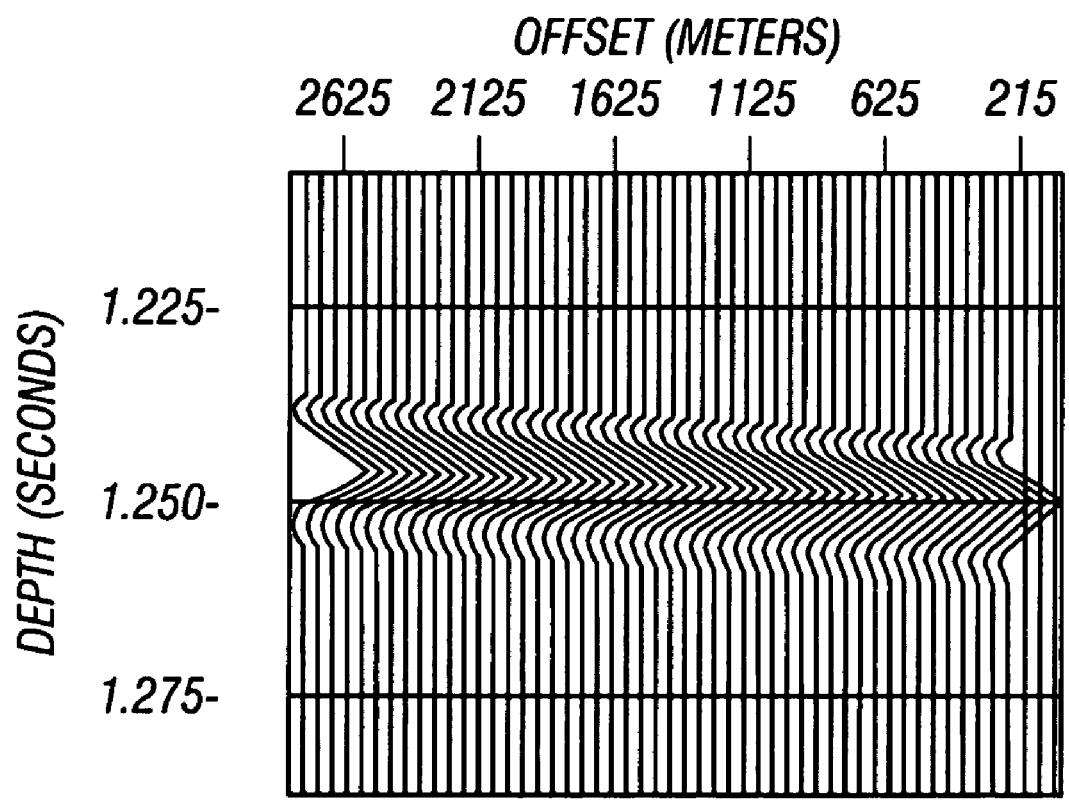
FIG. 6 shows another synthetic data set having timing error wherein the sensors move toward the source position.
Figure 7:
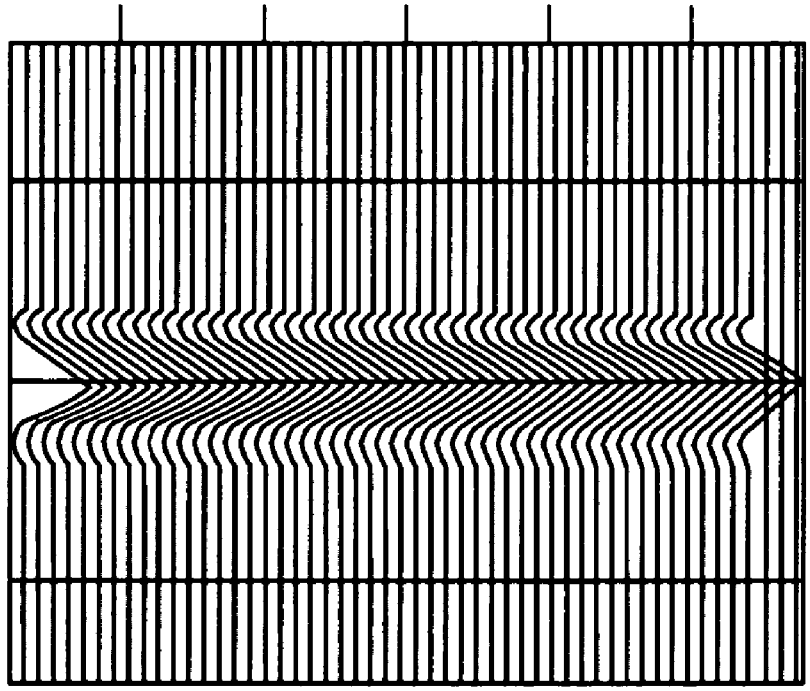
FIGS. 7 and 8 show the synthetic data sets of FIGS. 5 and 6, respectively, after correction using a method according to the invention.
Figure 8:
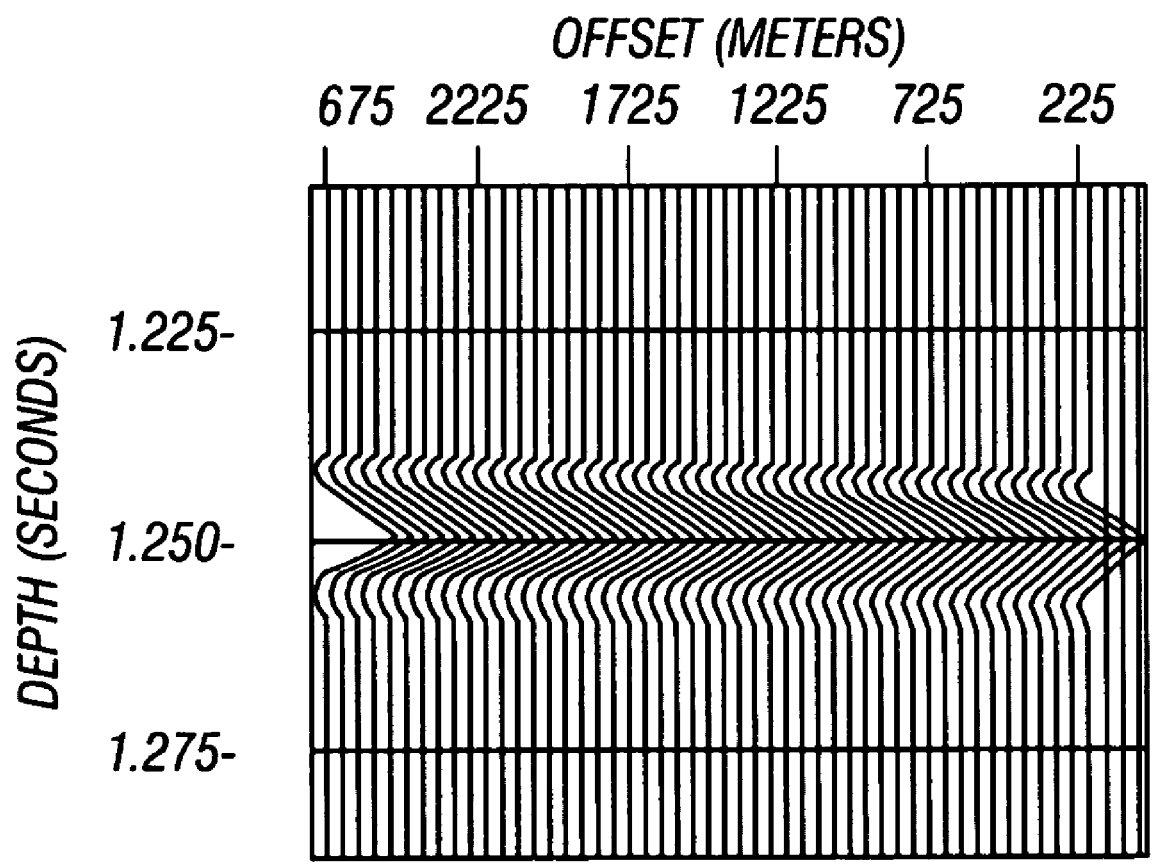

Example results of timing correction provided by methods according to the invention can be observed in FIGS. 5–8. FIG. 5 shows a synthetic seismic data set which models a streamer having sensors at the spacings from the source as described on the coordinate axis. Distance between successive sensors is modeled as 50 meters. The model is based on the sensors moving at 3 meters/second in the direction of the source position. The normal moveout velocity is modeled as 1850 meters/second. Note that the reflection event time decreases slightly as offset increases, because the sensors are moving toward the source position. The synthetic seismic data shown in FIG. 5 corresponds to the streamers towed from the first vessel (10 in FIG. 1). Corresponding synthetic seismic data are shown in FIG. 6 for the case where the sensors are moving away from the source position during acquisition. The synthetic seismic data shown in FIG. 6 corresponds to the streamers towed from the second vessel (18 in FIG. 1). FIGS. 7 and 8 show, respectively, the synthetic seismic data of FIGS. 5 and 6 after timing correction according to one embodiment of the invention.

Embodiments of a method according to the invention can increases the accuracy of velocity analysis and other attributes of seismic data interpretation by more precisely correcting the arrival time of seismic events for velocity of the sensors with respect to the source position during acquisition of marine seismic data.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer program for processing seismic data stored in a computer readable medium, the program having logic configured to cause a programmable computer to perform steps, comprising:

determining a position of a seismic energy source;

measuring a position of each of a plurality of seismic receivers at a time of actuation of the source and at at least one additional time;

determining a velocity of the seismic receivers with respect to the source position at the time of actuation from the measurements of the position at the actuation time and the at least one additional time;

correcting an offset of the receivers using the velocity; and determining a moveout correction for the signals detected by the receivers based on the corrected offset and a velocity of earth media through which seismic energy passed from the source to the receivers.

2. The program of claim 1 wherein the at least one additional time is subsequent to the actuation time.

3. The program of claim 1 wherein at least one additional time is prior to the actuation time.

4. The program of claim 1 wherein the receiver velocity comprises a component along a direction of motion of a seismic vessel and a component transverse to the direction of motion.

5. The program of claim 1 wherein the receivers comprise a plurality of hydrophones disposed on a plurality of seismic streamers towed by a seismic vessel.

6. The program of claim 4 wherein the receivers are towed from a location ahead of a location of the seismic energy source along a direction of motion of the seismic vessel.

7. A method for processing seismic data, comprising:
determining a position of a seismic energy source;

measuring a position of each of a plurality of seismic receivers at a time of actuation of the source and at at least one other time;

determining a velocity of the seismic receivers with respect to the source position at the time of actuation from the measurements of the position at the actuation time and at the at least one additional time;

correcting an offset of the receivers using the velocity; and determining a moveout correction for the signals detected by the receivers based on the corrected offset and a velocity of earth media through which seismic energy passed from the source to the receivers.

8. The method of claim 7 wherein the at least one additional time is subsequent to the actuation time.

9. The method of claim 7 wherein at least one additional time is prior to the actuation time.

10. The method of claim 7 wherein the receiver velocity comprises a component along a direction of motion of seismic vessel and a component transverse to the direction of motion.

11. The method of claim 7 wherein the receivers comprise a plurality of hydrophones disposed on a plurality of seismic streamers towed by a seismic vessel.

12. The method of claim 11 wherein the receivers are towed from a location ahead of a location of the seismic energy source along a direction of motion of the seismic vessel.

13. A method for seismic surveying, comprising:
towing a seismic energy source in a body of water;

towing a plurality of seismic receivers in the water at selected positions spaced apart from the source;

actuating the source at selected times;

recording signals detected by the sensors, the recording indexed to the actuation times;

determining a position of the seismic energy source;

measuring the position of each of the seismic receivers at each time of actuation of the seismic source and at at least one other time;

determining a velocity of the seismic receivers with respect to the source position at each actuation time from the measurements of the position at the actuation time and at the at least one additional time;

correcting an offset of the receivers using the determined velocity at each actuation time; and determining a moveout correction for the signals detected by the receivers based on the corrected offset and a velocity of earth media through which seismic energy passed from the source to the receivers.

14. The method of claim 13 wherein the at least one additional time is subsequent to the actuation time.

15. The method of claim 13 wherein at least one additional time is prior to the actuation time.

16. The method of claim 13 wherein the receiver velocity comprises a component along a direction of motion of seismic vessel and a component transverse to the direction of motion.

17. The method of claim 13 wherein the receivers comprise a plurality of hydrophones disposed on a plurality of seismic streamers towed by a seismic vessel.

18. The method of claim 17 wherein the receivers are towed from a location ahead of a location of the seismic energy source along a direction of motion of the seismic vessel.

* * * * *